United States Patent
Inoue

(10) Patent No.: US 7,818,494 B2
(45) Date of Patent: Oct. 19, 2010

(54) STORAGE DEVICE AND CONTROL METHOD OF THE STORAGE DEVICE

(75) Inventor: Hiroaki Inoue, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 493 days.

(21) Appl. No.: 12/006,886

(22) Filed: Jan. 7, 2008

(65) Prior Publication Data

US 2008/0209151 A1 Aug. 28, 2008

(30) Foreign Application Priority Data

Feb. 22, 2007 (JP) .............. 2007-041606

(51) Int. Cl.
*G06F 12/00* (2006.01)
(52) U.S. Cl. .............. 711/103; 711/113; 360/75
(58) Field of Classification Search .............. 711/103, 711/113; 360/75
See application file for complete search history.

(56) References Cited

U.S. PATENT DOCUMENTS

| | | | | |
|---|---|---|---|---|
| 5,307,473 A | * | 4/1994 | Tsuboi et al. .............. | 711/143 |
| 5,682,273 A | * | 10/1997 | Hetzler .............. | 360/75 |
| 6,958,961 B2 | | 10/2005 | Tsukihashi | |
| 7,117,276 B2 | * | 10/2006 | Maeda et al. .............. | 710/36 |

FOREIGN PATENT DOCUMENTS

| | | |
|---|---|---|
| JP | A 6-309776 | 11/1994 |
| JP | A 2000-195145 | 7/2000 |
| JP | A 2000-200461 | 7/2000 |

* cited by examiner

*Primary Examiner*—Hashem Farrokh
(74) *Attorney, Agent, or Firm*—Greer, Burns & Crain, Ltd.

(57) ABSTRACT

A storage device includes a storage medium, a nonvolatile memory, a head, a driving unit, and a processor. The driving unit drives the storage medium. The processor controls the storage device according to a process. The process includes receiving the data transmitted from the host, storing the data received into the nonvolatile memory, estimating a period of time from a time point of the reception of the data to a time point at which a usage rate of the nonvolatile memory becomes 100%, controlling the driving unit on the basis of comparison of the estimated period of time with a period of time before the storage medium is accessible, and writing the data stored in the nonvolatile memory to the storage medium by controlling the head in accordance with the control of the driving unit.

10 Claims, 5 Drawing Sheets

STORAGE DEVICE AND CONTROL METHOD OF THE STORAGE DEVICE

BACKGROUND OF THE INVENTION

1. Field of the Invention

The present invention relates to a storage device and a control method of the storage device.

2. Description of the Related Art

A general magnetic disc device (HDD) accesses data stored in a storage medium by rotating the storage medium using a spindle motor which constitutes a driving unit of the magnetic disc device.

FIG. 1 is a block diagram schematically showing a configuration of a magnetic disc device serving as a storage device in the related art. In FIG. 1, a storage device 20 is a hybrid hard disc device including a magnetic disc 12 as a storage medium, and a flash memory 14A as a nonvolatile memory.

The storage device 20 writes data to the flash memory 14A while a spindle motor 11 is in an off-state. Accordingly, even when a power source is unexpectedly disconnected, the data is less likely to be lost during processing.

The storage device 20 is connected to a host 1, which is a higher-level device, and performs writing and reading in response to a command issued by the host 1 on the magnetic disc 12 which is driven to rotate using the spindle motor 11.

The storage device 20 further includes a controller 23, a volatile memory (DRAM) 14B serving as a temporary memory, and the flash memory 14A capable of storing data even when a power source is disconnected.

The volatile memory 14B is used to adjust a difference between a speed at which data to be written is transmitted from the host 1 to the storage device 20 and a speed at which the data is written to the magnetic disc 12 or the flash memory 14A.

The controller 23 is used to write data to the magnetic disc 12 or the flash memory 14A in accordance with a state of the spindle motor 11. That is, while the spindle motor 11 stops driving, the data is written to the flash memory 14A.

Furthermore, the controller 23 is used to control an operation in which the data is written back from the flash memory 14A (hereinafter referred to as a "writing-back operation"). That is, the controller 23 controls an operation in which the data is read from the flash memory 14A and recorded in the magnetic disc 12.

Moreover, the controller 23 performs control of the writing-back operation so as to be executed when a usage rate of the flash memory 14A reaches 100% (refer to Japanese Unexamined Patent Application Publication Nos. 6-309776, 2006-260759 and 2000-200461).

FIG. 2 is a diagram illustrating the relationship between a usage rate of the flash memory 14A and a period of time in which the spindle motor 11 is driven in the storage device 20 shown in FIG. 1.

Data supplied from the host 1 is written to the flash memory 14A which is a nonvolatile memory.

However, when the usage rate of the flash memory 14A is 100%, the data should be written to the magnetic disc 12 by driving the spindle motor 11.

Accordingly, in such a control operation, when the usage rate of the flash memory 14A is 100%, the data supplied from the host 1 is stored in the volatile memory 14B for a period of time (T2−T1) required for driving the magnetic disc 12 to rotate, and therefore, the data is highly likely to be lost if a power supply is unexpectedly disconnected at such a time.

To address this problem, the spindle motor 11 may be controlled to be driven, when the usage rate of the flash memory 14A reaches a predetermined usage rate (for example, 80%), so as to start writing the data to the magnetic disc 12.

However, in this case, since the usage rate of the flash memory 14A is limited to 80%, the usability of the flash memory 14A deteriorates.

SUMMARY

Accordingly, it is an object of the present invention to provide a storage device, which attains reduced power consumption, which can avoid a failure caused when a power source is unexpectedly disconnected, and which improves the usability of a nonvolatile memory used in the storage device, and to provide a control method therefore.

According to an embodiment of the present invention, a storage device connected with a host includes a storage medium, a head, a nonvolatile memory, a driving unit, a processor. The head at least writes data into the storage medium. The driving unit drives the storage medium. The processor controls the storage device according to a process. The process includes receiving the data transmitted from the host, storing the data received into the nonvolatile memory, estimating a period of time from a time point of the reception of the data to a time point at which a usage rate of the nonvolatile memory becomes 100%, controlling the driving unit on the basis of comparison of the estimated period of time with a period of time before the storage medium is accessible, and writing the data stored in the nonvolatile memory to the storage medium by controlling the head in accordance with the control of the driving unit.

According to another embodiment of the present invention, there is provided a control method of a storage device having a driving unit for driving a storage medium. The control method of the storage device includes the steps of receiving data transmitted from a host, storing the data received from the host into a nonvolatile memory, estimating a period of time from a time point of the reception of the data to a time point at which a usage rate of the nonvolatile memory becomes 100%, controlling the driving unit on the basis of comparison of the estimated period of time with a period of time before the storage medium is accessible, and writing the data stored in the nonvolatile memory to the storage medium in accordance with the control of the driving unit.

DESCRIPTION OF THE PREFERRED EMBODIMENTS

Embodiments of the present invention will now be described hereinafter with reference to the accompanying drawings. Note that the embodiments will be described so that the present invention is clearly understood, and the present invention is not limited to the embodiments.

Figure 1:
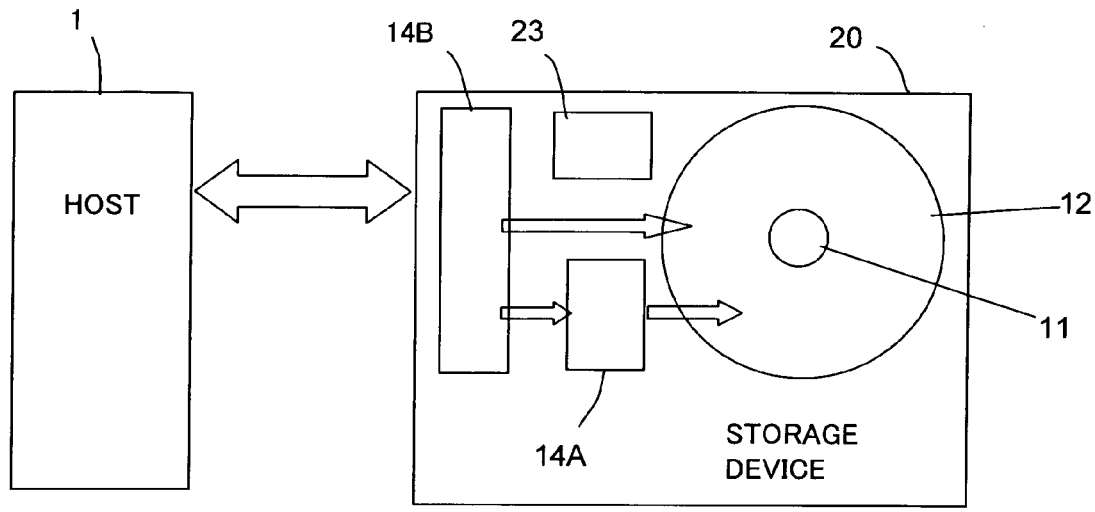
FIG. 1 is a block diagram schematically illustrating a configuration of a magnetic disc device serving as a storage device in the related art.
Figure 2:
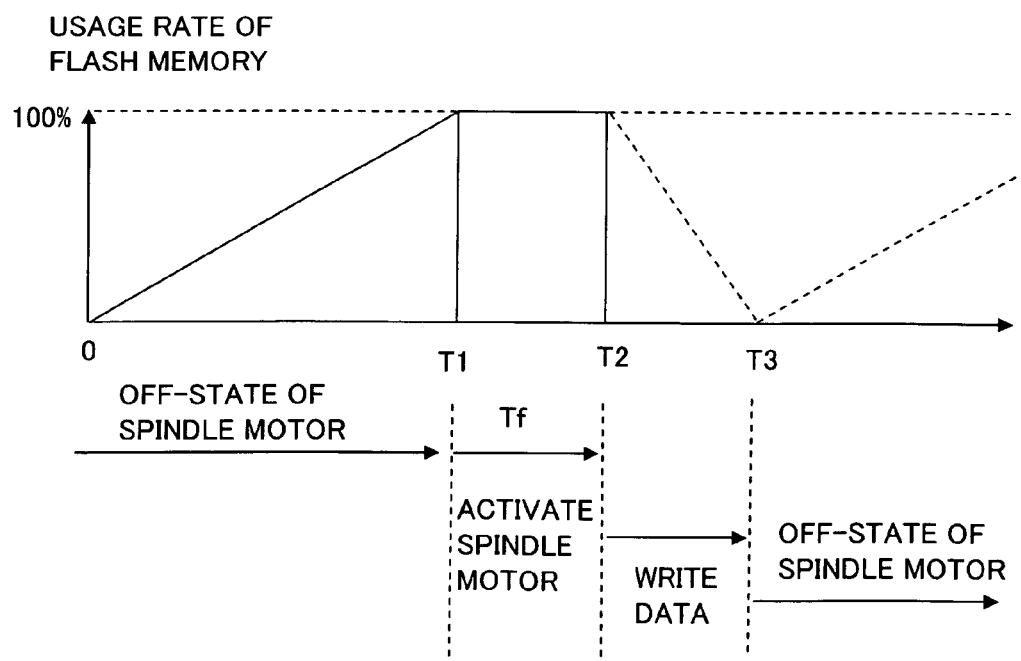
FIG. 2 is a diagram illustrating the relationship between a usage rate of a flash memory and a period of time in which the spindle motor is driven in the storage device shown in FIG. 1.
Figure 3:
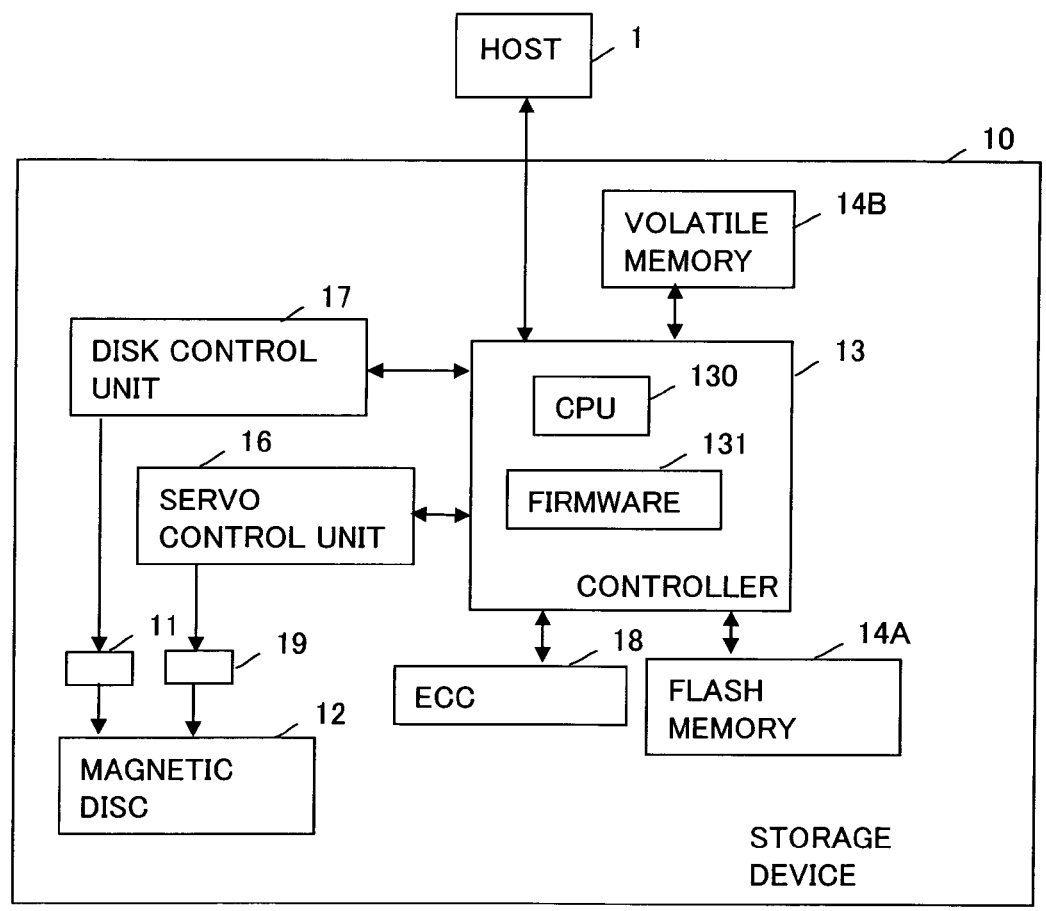
FIG. 3 is a block diagram illustrating a configuration of a storage device according to an embodiment.

FIG. 3 is a block diagram illustrating a configuration of a storage device. For instance, the storage device is a magnetic disc device and is connected to a host 1 which is a higher-level device. In FIG. 3, the magnetic disc device is a hybrid hard disc device 10.

The hybrid hard disc device 10 includes a magnetic disc 12 as a storage medium, a servo control unit 16 which servo-controls writing/reading operations of a magnetic head 19 performed on the magnetic disc 12, a disc control unit 17 which controls rotation of the magnetic disc 12 using a spindle motor 11 as a driving unit, an error checking function unit 18, a controller 13, the flash memory 14A, and a volatile memory 14B.

The controller 13 controls the servo control unit 16 and the disc control unit 17 to be started or stopped.

The volatile memory 14B is a temporary storage memory which is used to compensate for a disadvantage of the flash memory 14A, that is, low access speed. The flash memory 14A is a temporary storage memory which stores data transmitted from the host 1 through the volatile memory 14B when the spindle motor 11 is in an off-state.

In FIG. 3, the data is transmitted along with a writing command from the host 1 to the controller 13, an error of the data is corrected using the error checking function unit 18, and the corrected data is stored in the volatile memory 14B. Thereafter, the data is written from the volatile memory 14B to the flash memory 14A or the magnetic disc 12.

Functions required by the controller 13 are realized by execution controls performed using a CPU (Central Processing Unit) 130 in accordance with programs stored in firmware 131.

Figure 4A:
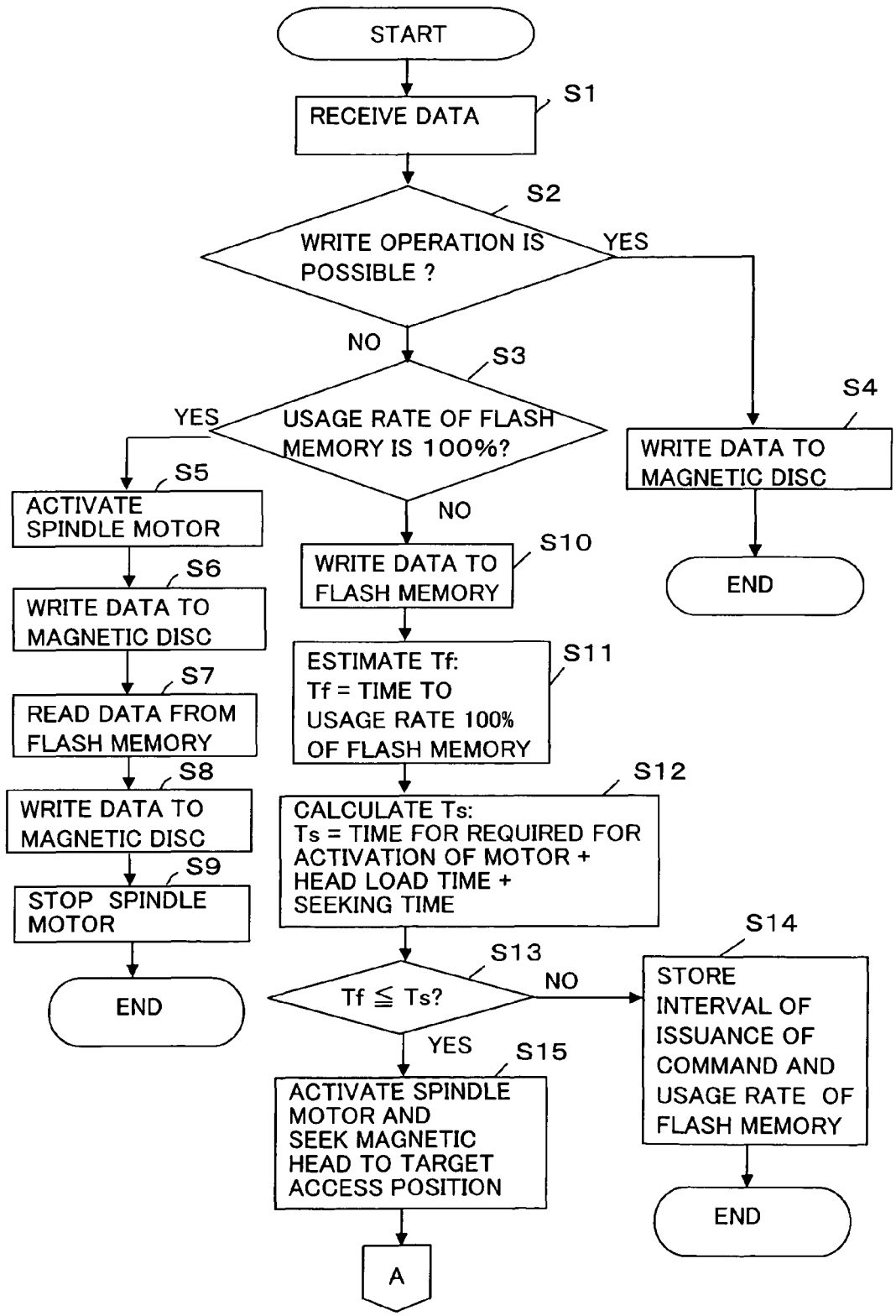
FIGS. 4A and 4B are flowcharts illustrating processing performed using a controller included in a hybrid hard disc device according to the embodiment.

FIG. 4A is a flowchart illustrating processing performed using the controller 13 included in the hybrid hard disc device 10. An operation performed in accordance with this flowchart is one of the functions required by the controller 13 which are realized by the execution controls performed using the CPU 130 in accordance with the programs stored in the firmware 131.

The CPU 130 stores the data transmitted from the host 1 in the volatile memory 14B in step S1.

When the spindle motor 11 is in an on-state, and therefore, a writing operation is possible in step S2, the data stored in the volatile memory 14B is written into the magnetic disc 12 under control of the CPU 130 in step S4. When the spindle motor 11 is in an off-state in step S2, it is determined whether a usage rate of the flash memory 14A is 100% in step S3. When it is determined that the usage rate of the flash memory 14A is 100%, the spindle motor 11 is activated in step S5, and the data is stored in the magnetic disc 12 in step S6.

Furthermore, the data is read from the flash memory 14A in step S7, and the read data is written to the magnetic disc 12 in step S8. Accordingly, the usage rate of the flash memory 14A becomes 0% and driving of the spindle motor 11 is stopped in step S9.

On the other hand, when it is determined that the usage rate of the flash memory 14A is not 100% in step S3, the CPU 130 writes the data to the flash memory 14A in step S10. Then, the CPU 130 makes a determination from step S11 to step S15 as to whether the spindle motor 11 should be activated. This determination process is described in detail with reference to FIGS. 5 and 6.

Figure 5:
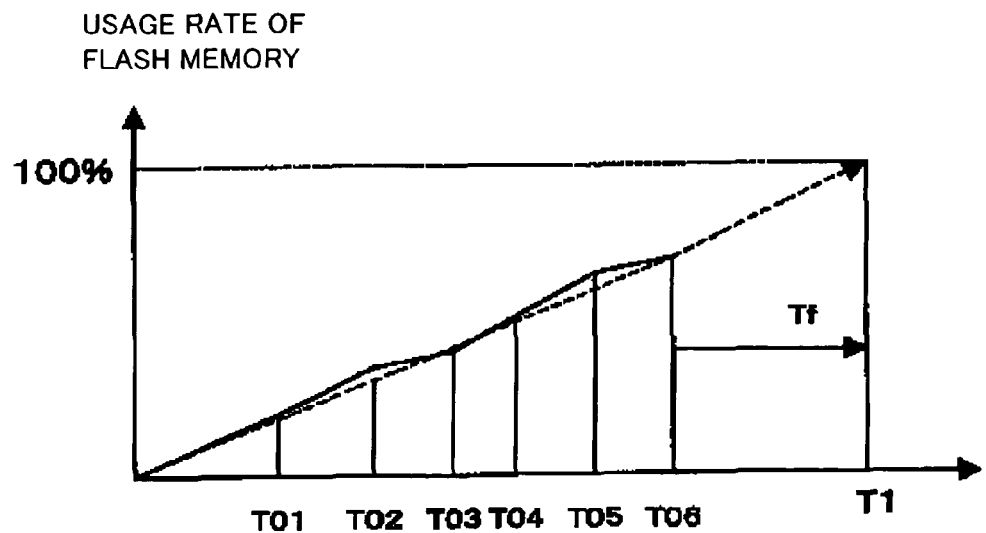
FIG. 5 is a diagram illustrating a change of a usage rate of a flash memory according to the embodiment.

FIG. 5 is a diagram illustrating a change of the usage rate of the flash memory 14A.

In FIG. 5, the CPU 130 calculates the usage rate of the flash memory 14A every time the writing command is issued from the host 1. The writing command from the host 1 is not regularly transmitted to the hybrid hard disc device 10 in the case with FIG. 5.

In addition, the CPU 130 calculates a rate of increase (gradient) of the usage rate of the flash memory 14A on the basis of intervals of issuances of writing commands. In this way, a period of time Tf from time point of reception of the writing command to a time point at which the usage rate reaches 100% is estimated in step S11.

A period of time Tf from a time point T06 to a time point at which the usage rate reaches 100% is estimated as shown in FIG. 5.

The CPU 130 calculates, in step S12, a total time Ts of a time required for activation of the spindle motor 11, the magnetic head 19 load time required for moving the magnetic head 19 from a retracted position to an initial position on the magnetic disc 12, and a seeking time required for seeking a target access position to which the magnetic head 19 is to be moved. Ts is a period of time before the magnetic disc 12 is accessible.

Here, as for the seeking time, a time required for moving the magnetic head 19 to the access position is varied in accordance with a position of the magnetic head 19 before being moved, and the seeking time herein means an average seeking time.

Then, the CPU 130 compares the thus obtained total time Ts with the estimated period of time Tf from a time point T06 to the time point at which the usage rate reaches 100% in step S13.

When it is determined that the total time Ts is equal to or longer than the period of time Tf in step S13, the spindle motor 11 is activated, and the magnetic head 19 is controlled to seek the target access position (hereinafter referred to as a "seeking processing") in step S15.

On the other hand, when it is determined that the total time Ts is smaller than the period of time Tf in step S13, the CPU 130 controls the writing operation of the data transmitted from the host 1 along with the writing command so that intervals of the issuances of the commands from the host 1 and usage rates of the flash memory 14A are stored every time the data is written to the flash memory 14A in step S14.

Figure 4B:
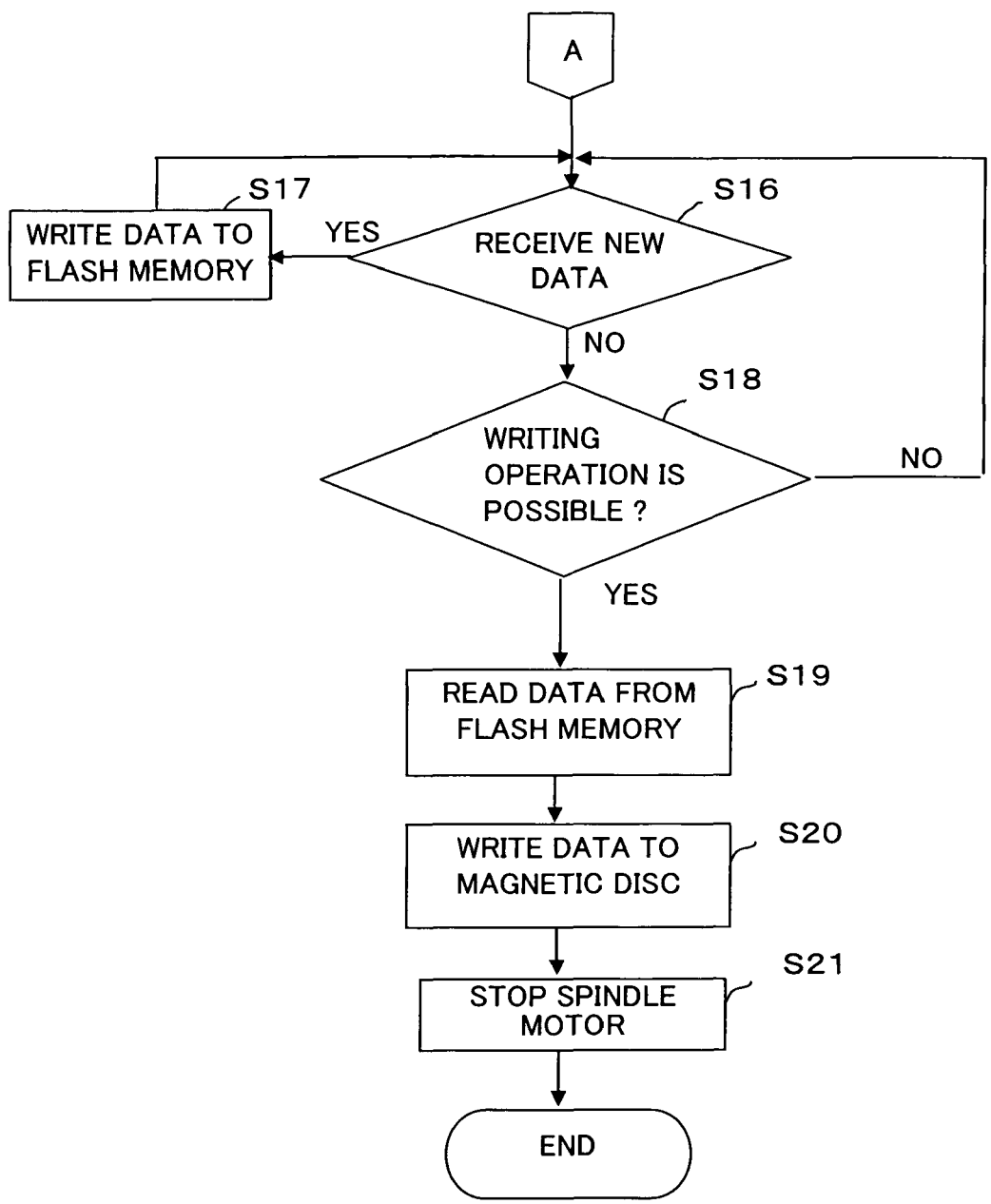

FIG. 4B shows a subsequent flowchart illustrating the processing of the controller 13 included in the hybrid hard disc device 10. In step S16, the CPU 130 checks whether new data to be written is received from the host 1 after a request of activation of the spindle motor 11 is issued and after a request of the seeking processing is issued.

When it is determined that the new data to be written is received from the host 1 in step S16, the new data is written to the flash memory 14A through the volatile memory 14B in step S17, and thereafter, the process returns to step S16. The CPU 130 checks whether the spindle motor 11 reaches a predetermined speed and the seeking processing is terminated in step S18. When it is determined that the seeking processing is not terminated or the spindle motor 11 does not reach a predetermined speed, the process returns to step S16.

On the other hand, when it is determined that the seeking processing is terminated and the spindle motor 11 reaches a predetermined speed, a writing operation is possible. The CPU 130 reads the data from the flash memory 14A in step S19, and writes the data to the magnetic disc 12 in step S20. Accordingly, usage rate of the flash memory 14A becomes 0% and driving of the spindle motor 11 is stopped in step S21.

Figure 6:
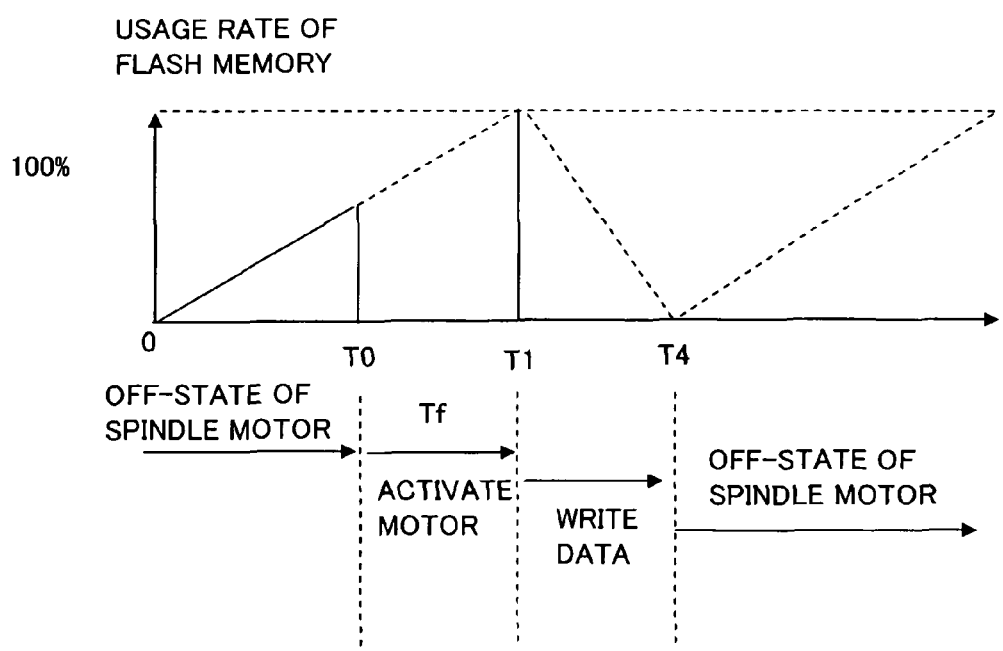
FIG. 6 is a diagram illustrating the relationship between the usage rate of the flash memory and a period of time in which the spindle motor is driven according to the embodiment.

FIG. 6 is a diagram illustrating the relationship between the usage rate of the flash memory 14A and a period of time in which the spindle motor is driven. As shown in FIG. 6, when the usage rate of the flash memory 14A is smaller than 100%, the spindle motor 11 which is the driving unit of the magnetic disc 12 may be driven using the CPU 130 at time point T0, and when the usage rate of the flash memory 14A reaches 100% at time point T1, a next command may be issued, for example. In this case, the usage rate of the flash memory 14A is improved to the maximum.

Furthermore, when the usage rate of the flash memory 14A is 100%, the data supplied from the host 1 is not necessarily stored in the volatile memory 14B until the spindle motor 11 is activated. Accordingly, the data is less likely to be lost when a power supply is unexpectedly disconnected, and high reliability is attained.

Furthermore, when the usage rate of the flash memory 14A is smaller than 100%, the spindle motor 11 is activated at the time point T0, and thereafter, the usage rate of the flash memory 14A becomes 0% at time point T4 since the data is written to the magnetic disc 12, and the driving of the spindle motor 11 is stopped. Thus, the spindle motor 11 is only driven from the time point T0 to the time point T4.

Consequently, power consumption of the hybrid hard disc device 10 may be considerably reduced. And the hybrid hard disc device 10 reduces power consumption, avoids a failure caused when a power source is unexpectedly disconnected, and improves the usability of the flash memory 14A, even in a connection environment in which data is not stably transmitted in accordance with an application program of the host 1.

What is claimed is:

1. A storage device connected with a host, comprising:
   a storage medium;
   a nonvolatile memory;
   a head for at least writing data into the storage medium;
   a driving unit for driving the storage medium; and
   a processor to control the storage device according to a process including:
   receiving data transmitted from the host,
   storing the data received in the nonvolatile memory,
   estimating a period of time from a time point of the reception of the data to a time point at which a usage rate of the nonvolatile memory becomes 100%,
   controlling the driving unit on the basis of comparison of the estimated period of time with a period of time before the storage medium is accessible, and
   writing the data stored in the nonvolatile memory to the storage medium by controlling the head in accordance with the control of the driving unit.

2. The storage device according to claim 1,
   wherein the processor estimates a period of time from a time point of the reception of the data to a time point at which the usage rate of the nonvolatile memory reaches 100% on the basis of the usage rate of the nonvolatile memory at an arbitrary time point and rate of increase of the usage rate of the nonvolatile memory in a predetermined period of time.

3. The storage device according to claim 1,
   wherein the period of time before the storage medium is accessible is equal to a period of time before the storage medium which is in an off-state is driven to be rotated a predetermined number of times so as to become accessible.

4. The storage device according to claim 1,
   wherein the period of time before the storage medium is accessible includes a period of time before the head is loaded onto the storage medium from a predetermined retracted position.

5. The storage device according to claim 1,
   wherein the period of time before the storage medium is accessible includes a period of time before the head is positioned at a predetermined position on the storage medium.

6. A control method of a storage device having a driving unit for driving a storage medium, comprising the steps of:
   (a) receiving data transmitted from a host;
   (b) storing the data received from the host in a nonvolatile memory;
   (c) estimating a period of time from a time point of the reception of the data to a time point at which a usage rate of the nonvolatile memory becomes 100%;
   (d) controlling the driving unit on the basis of comparison of the estimated period of time with a period of time before the storage medium is accessible; and
   (e) writing the data stored in the nonvolatile memory to the storage medium in accordance with the control of the step (d).

7. The control method of the storage device according to claim 6,
   wherein a period of time from time point of the reception of the data to a time point at which a usage rate of the nonvolatile memory reaches 100% is estimated on the basis of the usage rate of the nonvolatile memory at an arbitrary time point and rate of increase of the usage rate of the nonvolatile memory in step (c).

8. The control method of the storage device according to claim 6,
   wherein the period of time before the storage medium is accessible is equal to a period of time before the storage medium which was in an off-state is driven to be rotated a predetermined number of times so as to become accessible.

9. The control method of the storage device according to claim 6,
   wherein the period of time before the storage medium is accessible includes a period of time before a head is loaded onto the storage medium from a predetermined retracted position.

10. The control method of the storage device according to claim 6,
    wherein the period of time before the storage medium is accessible includes a period of time before the head is positioned at a predetermined position on a storage medium.

* * * * *